United States Patent
Wuidart

(10) Patent No.: US 9,344,156 B2
(45) Date of Patent: May 17, 2016

(54) PROTECTION OF COMMUNICATION BY AN ELECTROMAGNETIC TRANSPONDER

(75) Inventor: Luc Wuidart, Pourrières (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 14/123,755

(22) PCT Filed: Apr. 18, 2012

(86) PCT No.: PCT/FR2012/050845
§ 371 (c)(1),
(2), (4) Date: Dec. 16, 2013

(87) PCT Pub. No.: WO2012/164181
PCT Pub. Date: Dec. 6, 2012

(65) Prior Publication Data
US 2014/0113555 A1 Apr. 24, 2014

(30) Foreign Application Priority Data
Jun. 3, 2011 (FR) ...................................... 11 54864

(51) Int. Cl.
*H04B 5/00* (2006.01)
*G06K 19/07* (2006.01)
*G06K 19/073* (2006.01)
*H04L 29/06* (2006.01)

(52) U.S. Cl.
CPC .......... *H04B 5/0068* (2013.01); *G06K 19/0723* (2013.01); *G06K 19/07309* (2013.01); *G06K 19/07318* (2013.01); *H04L 63/0492* (2013.01)

(58) Field of Classification Search
CPC ............. H04B 5/0068; G06K 19/0723; G06K 19/07309; G06K 19/07318; H04L 63/0492
USPC ........................... 455/41.1, 41.2, 41.3, 67.11
See application file for complete search history.

(56) References Cited

U.S. PATENT DOCUMENTS

| | | | |
|---|---|---|---|
| 5,703,573 | A | 12/1997 | Fujimoto et al. |
| 6,356,198 | B1 | 3/2002 | Wuidart et al. |
| 6,462,647 | B1 | 10/2002 | Roz |
| 6,473,028 | B1 | 10/2002 | Luc |
| 6,547,149 | B1 | 4/2003 | Wuidart et al. |
| 6,650,226 | B1 | 11/2003 | Wuidart et al. |

(Continued)

FOREIGN PATENT DOCUMENTS

| | | |
|---|---|---|
| EP | 0 722 094 A1 | 7/1996 |
| EP | 0857981 | 8/1998 |

(Continued)

OTHER PUBLICATIONS

International Search Report dated Sep. 7, 2012 from corresponding International Application No. PCT/FR2012/050845.

(Continued)

*Primary Examiner* — Ping Hsieh
(74) *Attorney, Agent, or Firm* — Seed IP Law Group PLLC

(57) ABSTRACT

A method for protecting communication between an electromagnetic transponder and a terminal, wherein the transmission of an acknowledgement for a request received from a terminal by the transponder is only allowed when the transponder is in mechanical contact or in quasi-mechanical contact with the terminal.

17 Claims, 4 Drawing Sheets

(56) References Cited

U.S. PATENT DOCUMENTS

| | | |
|---|---|---|
| 6,650,229 B1 | 11/2003 | Wuidart et al. |
| 6,703,921 B1 | 3/2004 | Wuidart et al. |
| 6,784,785 B1 | 8/2004 | Wuidart et al. |
| 6,879,246 B2 | 4/2005 | Wuidart |
| 6,944,424 B2 | 9/2005 | Heinrich et al. |
| 6,950,008 B2 * | 9/2005 | Hagl et al. ............. 340/5.61 |
| 6,960,985 B2 | 11/2005 | Wuidart |
| 7,005,967 B2 | 2/2006 | Wuidart |
| 7,046,121 B2 | 5/2006 | Wuidart |
| 7,049,935 B1 | 5/2006 | Wuidart et al. |
| 7,049,936 B2 | 5/2006 | Wuidart |
| 7,058,357 B1 | 6/2006 | Wuidart et al. |
| 7,107,008 B2 | 9/2006 | Wuidart |
| 7,263,330 B2 | 8/2007 | Wuidart |
| 7,606,532 B2 | 10/2009 | Wuidart |
| 7,995,965 B2 | 8/2011 | Wuidart |
| 8,130,159 B2 | 3/2012 | Wuidart et al. |
| 8,395,485 B2 | 3/2013 | Wuidart |
| 8,446,259 B2 | 5/2013 | Wuidart |
| 8,482,388 B2 | 7/2013 | Wuidart |
| 8,564,413 B2 | 10/2013 | Wuidart |
| 8,676,163 B2 | 3/2014 | Wuidart |
| 8,693,956 B2 | 4/2014 | Wuidart |
| 8,718,552 B2 | 5/2014 | Wuidart |
| 8,798,533 B2 | 8/2014 | Wuidart |
| 8,907,761 B2 | 12/2014 | Wuidart |
| 8,922,338 B2 | 12/2014 | Wuidart |
| 8,922,341 B2 | 12/2014 | Wuidart |
| 8,988,196 B2 | 3/2015 | Wuidart |
| 9,098,788 B2 | 8/2015 | Wuidart |
| 2003/0071717 A1 | 4/2003 | Hagl et al. |
| 2003/0121985 A1 | 7/2003 | Baldischweiler et al. |
| 2003/0169169 A1 | 9/2003 | Wuidart et al. |
| 2004/0104809 A1 | 6/2004 | Rizzo et al. |
| 2005/0001609 A1 | 1/2005 | Cuylen |
| 2005/0141256 A1 | 6/2005 | Yamazaki et al. |
| 2005/0231328 A1 | 10/2005 | Castle et al. |
| 2006/0172702 A1 | 8/2006 | Wuidart et al. |
| 2007/0164122 A1 | 7/2007 | Ju |
| 2008/0079542 A1 | 4/2008 | Rofougaran |
| 2008/0129509 A1 | 6/2008 | Duron |
| 2008/0136643 A1 | 6/2008 | Yeo et al. |
| 2008/0204206 A1 | 8/2008 | Frohler |
| 2009/0065575 A1 | 3/2009 | Phillips et al. |
| 2009/0273452 A1 | 11/2009 | Wuidart |
| 2010/0068999 A1 | 3/2010 | Bangs et al. |
| 2010/0282849 A1 | 11/2010 | Mair |
| 2010/0283698 A1 | 11/2010 | Orihara |
| 2010/0291871 A1 | 11/2010 | Butler |
| 2010/0323629 A1 | 12/2010 | Wuidart |
| 2010/0328045 A1 | 12/2010 | Goto et al. |
| 2011/0095769 A1 | 4/2011 | Wuidart |
| 2011/0140852 A1 | 6/2011 | Wuidart |
| 2011/0193688 A1 | 8/2011 | Forsell |
| 2011/0319016 A1 * | 12/2011 | Gormley et al. ............. 455/41.1 |
| 2012/0092901 A1 | 4/2012 | Wuidart |
| 2012/0105012 A1 | 5/2012 | Wuidart |
| 2014/0113554 A1 | 4/2014 | Wuidart |
| 2014/0113692 A1 | 4/2014 | Wuidart |
| 2014/0118115 A1 | 5/2014 | Wuidart |

FOREIGN PATENT DOCUMENTS

| | | | |
|---|---|---|---|
| EP | 1 043 677 A1 | 10/2000 | |
| EP | 1 071 038 A1 | 1/2001 | |
| EP | 1 304 661 A1 | 4/2003 | |
| EP | 2077518 A1 | 7/2009 | |
| EP | 2114019 A1 | 11/2009 | |
| FR | 2 757 952 A1 | 7/1998 | |
| GB | 2 321 725 A | 8/1998 | |
| GB | 2464362 A | 4/2010 | |
| WO | WO 2009105115 A2 * | 8/2009 | ............ H04B 5/00 |

OTHER PUBLICATIONS

International Search Report dated Sep. 10, 2012 from potentially related International Application No. PCT/FR2012/050842.

International Search Report dated Jun. 26, 2012 from potentially related International Application No. PCT/FR2012/050843.

International Search Report dated Sep. 7, 2012 from potentially related International Application No. PCT/FR2012/050844.

English Translation of the Written Opinion of the International Searching Authority dated Dec. 4, 2013 from corresponding International Application No. PCT/FR2012/050845.

English Translation of the Written Opinion of the International Searching Authority dated Dec. 4, 2013 from corresponding International Application No. PCT/FR2012/050842, 5 pages.

English Translation of the Written Opinion of the International Searching Authority dated Dec. 4, 2013 from corresponding International Application No. PCT/FR2012/050843, 10 pages.

English Translation of the Written Opinion of the International Searching Authority dated Dec. 4, 2013 from corresponding International Application No. PCT/FR2012/050844, 6 pages.

French Search Report dated Feb. 9, 2010, for corresponding FR Application No. 0954147, 2 pages.

French Search Report dated Feb. 9, 2010, for corresponding FR Application No. 0954148, 2 pages.

French Search Report dated Feb. 8, 2010, for corresponding FR Application No. 0954149, 2 pages.

French Search Report dated Feb. 2, 2010, for corresponding FR Application No. 0954345, 2 pages.

French Search Report dated Feb. 3, 2010, for corresponding FR Application No. 0954347, 2 pages.

French Search Report dated Feb. 17, 2010, for corresponding FR Application No. 0954351, 2 pages.

Translation of International Search Report and Written Opinion dated Jun. 3, 2010, for corresponding International Application No. PCT/FR2010/051090, 4 pages.

Translation of International Search Report and Written Opinion dated Jun. 3, 2010, for corresponding International Application No. PCT/FR2010/051091, 4 pages.

* cited by examiner

PROTECTION OF COMMUNICATION BY AN ELECTROMAGNETIC TRANSPONDER

CROSS REFERENCE TO RELATED APPLICATIONS

This application is the U.S. National Stage of international patent application number PCT/FR2012/050845, filed on Apr. 18, 2012, which claims the priority benefit of French patent application Ser. No. 11/54,864, filed on Jun. 3, 2011, entitled PROTECTION OF A COMMUNICATION BY AN ELECTROMAGNETIC TRANSPONDER, which is hereby incorporated by reference to the maximum extent allowable by law.

BACKGROUND

1. Technical Field

Embodiments generally relate to systems using transponders, that is, transceivers (generally mobile), capable of communicating in a contactless and wireless manner with a terminal. Embodiments more specifically relate to the protection of a near field communication between a transponder and a reader.

2. Discussion of the Related Art

Electromagnetic transponder systems are more and more used with the coming up of mobile telecommunication devices equipped with near field communication (NFC) routers. In such devices, the mobile equipment may be used both as a transponder reader, for example, as a contactless chip card reader and, conversely, as a transponder for a near field communication with a terminal, for example, another mobile device, an access terminal, etc.

Many methods aiming at protecting transactions between an electromagnetic transponder and a reader are known. Such methods generally use systems for encrypting communications, be it by symmetrical or asymmetrical algorithms.

All these systems require an established communication to make a protection of the transaction possible.

Further, such methods are generally inefficient to prevent a pirate device simulating a terminal from starting a communication with a transponder.

SUMMARY

An embodiment provides a mechanism for protecting communication between an electromagnetic transponder and a terminal, which overcomes all or part of the disadvantages of usual solutions.

An embodiment provides a solution which does not require establishing a communication to detect the possible presence of a pirate terminal.

An embodiment provides a solution compatible with usual communication encryption processes.

An embodiment provides a solution requiring no modification on the terminal side.

An embodiment provides a method for protecting a communication between an electromagnetic transponder and a terminal, wherein the transmission by the transponder of an acknowledgement for a request received from a terminal is only allowed when the transponder is in mechanical contact or in quasi-mechanical contact with the terminal.

According to an embodiment:

a) a current value of a ratio of the current coupling factor between the transponder and the terminal to an optimum coupling factor with a first value of the resistive load is calculated and stored;

b) said current value is compared with a previous value of this ratio, stored in a previous iteration; and c) as long as the two values of the ratio are not equal, steps a) and b) are repeated.

According to an embodiment, the values of said ratio are obtained after the measurements:

of a first value of a D.C. voltage provided by a rectifier across an oscillating circuit of the transponder for a first value of the resistive load of this oscillating circuit; and of a second value of said voltage for a second resistive load value.

According to an embodiment, in case the current and previous ratios are equal:

d) the current ratio is compared with 1; and e) the sending of an acknowledgement is allowed if this unity threshold has not been reached.

According to an embodiment, if the current ratio is greater than 1:

the sending of the acknowledgement is preceded by a decrease in the value of the resistive load if the current ratio is smaller than a threshold.

According to an embodiment, the value of the resistive load is decreased to obtain, across the oscillating circuit, a voltage complying with the following formula:

$$V_{C2opt|R21} = \left(1 + \frac{1}{r_i^2}\right) \cdot \frac{V_{C2|R20}}{2},$$

where $V_{C2|R20}$ designates said first value of the voltage and $r_i$ designates the current ratio.

According to an embodiment, if the current ratio is different from the previous ratio, the possible transmission of an acknowledgement is blocked.

Another embodiment provides an electromagnetic transponder comprising means capable of implementing the method.

Another embodiment provides a cell phone comprising such an electromagnetic transponder.

The foregoing and other objects, features, and advantages will be discussed in detail in the following non-limiting description of specific embodiments in connection with the accompanying drawings.

DETAILED DESCRIPTION

Figure 1:
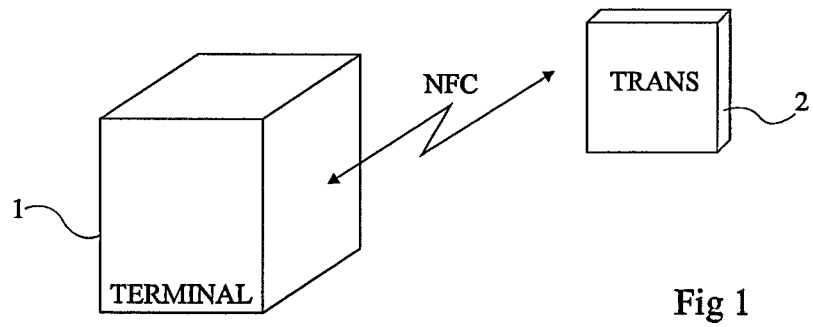
FIG. 1 very schematically shows an example of a near-field communication system.

The same elements have been designated with the same reference numerals in the different drawings. For clarity, only those steps and elements which are useful to the understanding of the described embodiments have been shown and will be detailed. In particular, the origin and the destination of the data transmitted in communications between a transponder and a terminal have not been detailed, the described embodiments being compatible with any usual communication.

FIG. 1 is a block diagram of an electromagnetic transponder communication system. A terminal 1 (TERMINAL) is capable of communicating in near field (for example according to a near field communication protocol, NFC) with a distant element, that is, a transponder 2 (TRANS).

The terminal may take different forms, for example, a transport ticket validation terminal, an electronic passport reader, a laptop computer, a mobile communication device (cell phone or smartphone, PDA, etc.), an electronic control unit for starting an automobile vehicle, etc.

The transponder may also take different forms, for example, a chip card, an electronic transport ticket, an electronic passport, a telecommunication terminal (smartphone, PDA, etc.), an electronic tag, etc.

Figure 2:
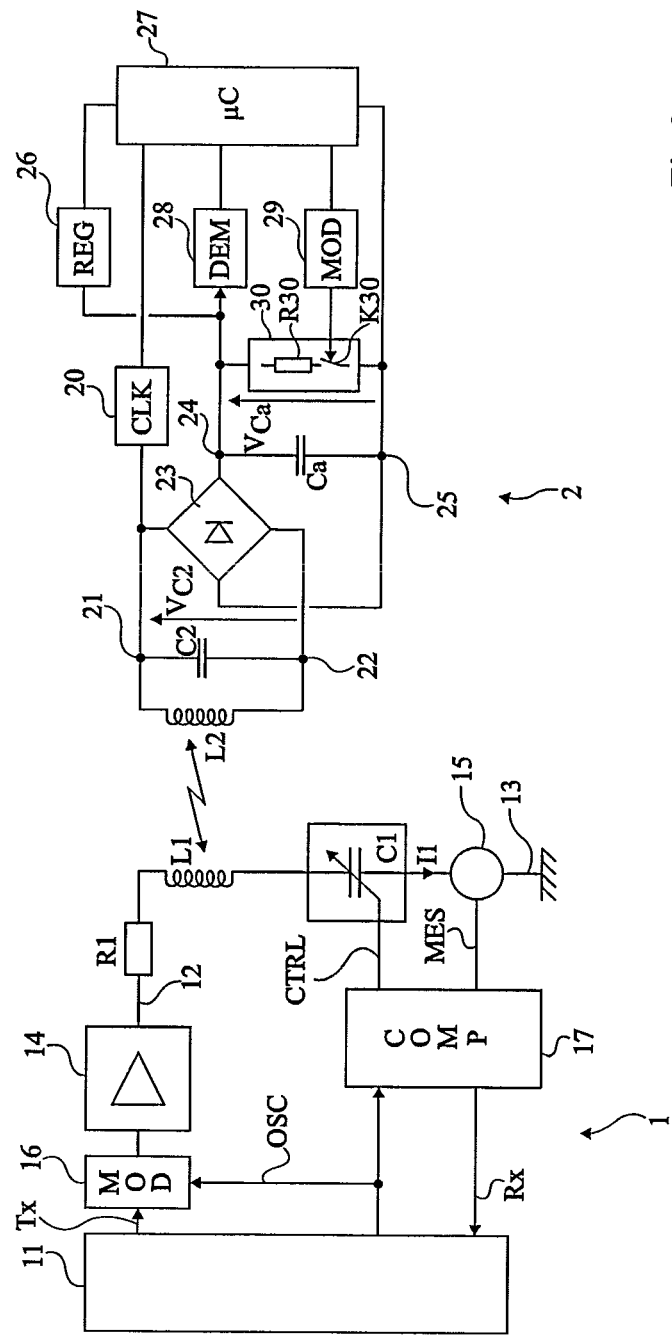
FIG. 2 is a simplified block diagram of a terminal and of a transponder of a near-field communication system.

FIG. 2 very schematically shows a simplified example of a terminal 1 and of a transponder 2.

Terminal 1 comprises an oscillating circuit, generally in series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, which have not been detailed. The elements of terminal 1 most often draw the power necessary to their operation from a supply circuit (not shown) connected, for example, to the power line distribution system or to a battery (for example, that of an automobile vehicle or of a portable telephone or computer). Modulator 16 provides a high-frequency carrier (for example, at 13.56 MHz) to oscillating circuit L1-C1, which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the carrier signal corresponding to the signal provided to amplifier 14 in the absence of data Tx to be transmitted. The regulation is performed by varying capacitance C1 of the oscillating circuit of the terminal to maintain the current in antenna L1 in constant phase relationship with the reference signal. This reference signal, for example, corresponds to signal OSC provided to modulator 16. Signal CTRL originates from a circuit 17 (COMP) having the function of detecting the phase interval with respect to the reference signal and of accordingly modifying the capacitance of element C1. The comparator receives data MES relative to current I1 in the oscillating circuit, detected by measurement element 15 (for example, a current transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture a magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in the same chip.

To transmit data from terminal 1 to transponder 2, circuit 16 modulates (generally in amplitude) the carrier (signal OSC) according to signal Tx. On the transponder side, these data are demodulated by demodulator 28 based on voltage $V_{Ca}$ across capacitor Ca. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal at a constant level. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is selected to be sufficiently long to avoid disturbing the possible retromodulation from a transponder and sufficiently short as compared with the speed at which a transponder passes in the field of the terminal. One can speak of a static regulation with respect to the modulation frequencies (for example, a 13.56-MHz frequency of the remote supply carrier and a 847.5-kHz retromodulation frequency) used to transmit data from the transponder to the terminal.

An example of phase regulation terminal is described in document EP-A-0857981. The fact that the phase is regulated on the terminal side enables using current and voltage measurements in the oscillating circuit of the transponder to deduce therefrom information relative to the coupling of the transponder when it is in the field of a terminal.

Such information takes into account, in particular, the coupling between the transponder and the terminal, that is, the coefficient of the coupling between the oscillating circuit of the terminal and that of the transponder. This coupling coefficient essentially depends on the distance separating the transponder from the terminal. The coupling coefficient, designated as k, between the oscillating circuits of a transponder and of a terminal, always ranges between 0 and 1.

The position where the transponder is placed against the terminal is considered as the maximum coupling position. Indeed, the antennas of the transponder and of the terminal cannot be brought closer to each other, unless the terminal package is eliminated.

According to the described embodiments, different relations between the electric quantities measurable by the transponder in different configurations of operation with a terminal are used to force the holder of the transponder to place himself as close as possible to the terminal. The aim then is to avoid that a pirate device establish a communication with the transponder while being further away than the terminal with which the transponder wants to communicate.

Another feature is to reassure the holder of the transponder. Indeed, applications often concern payments or authentications. Only enabling a communication to be established when the transponder is "laid" on the terminal reassures the user.

For this purpose, it is provided to force the user to place the transponder in a quasi-contact position (distance shorter than one mm), preferably in mechanical contact, with the terminal, be it by moving the terminal or the transponder according to cases. To amounts to forcing the transponder to be in a position of maximum coupling with its terminal.

The notion of contact used herein relates to a mechanical contact with the terminal package, that is, a position where the antennas of the terminal and of the transponder are as close as possible to each other. It is not an electric contact, the communication and the possible remote supply of the transponder always being performed with no electric contact.

Usually, a terminal periodically and permanently sends polling requests to possible transponders present in its field. A transponder which receives such a request responds to the terminal with an acknowledgement (message generally designated as ATQ) to notify its presence to the terminal and to enable said terminal to start the communication.

In the embodiments which will be described, the sending of the acknowledgement is restricted to only occur once it is known that the transponder is in front of a terminal, which appears to be authorized, and placed almost against it.

It is now known that an optimum coupling position $k_{opt}$, corresponding to the position at which voltage $V_{C2}$ recovered across the transponder (more specifically across its antenna) is maximum, exists between the terminal and the transponder. This optimum coupling position does not necessarily correspond to the maximum coupling position.

Figure 3:
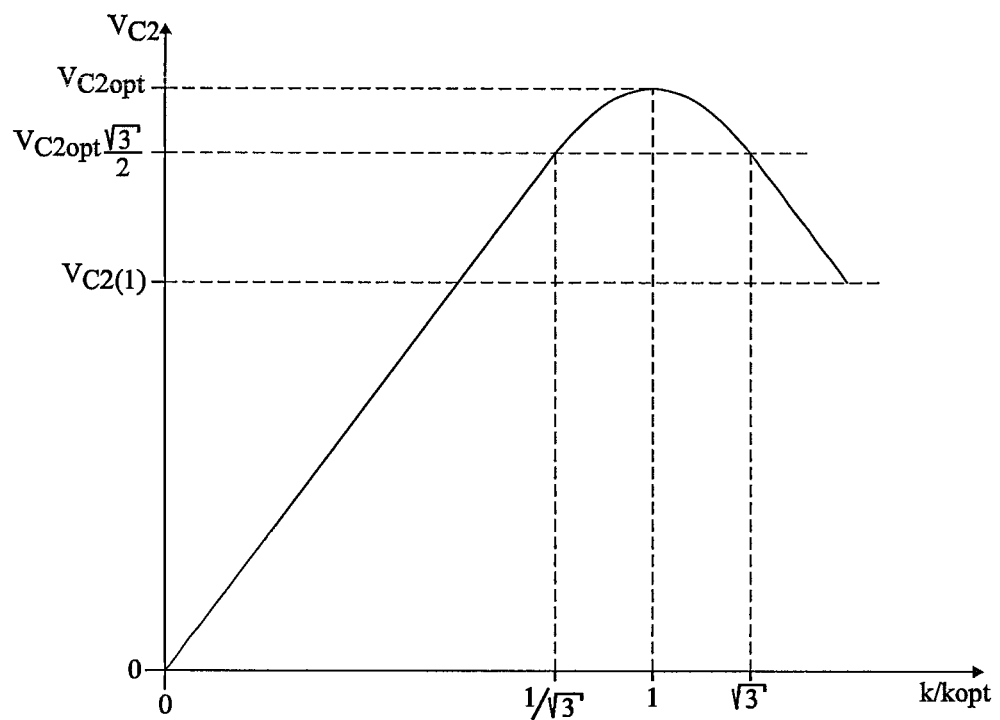
FIG. 3 illustrates an example of the variation of the voltage across the resonant circuit of the transponder according to a normalized coupling.

FIG. 3 shows an example of the shape of voltage $V_{C2}$ recovered on the transponder side according to normalized coupling $k/k_{opt}$.

The curve starts from the origin of ordinates (zero voltage) for a zero coupling. This corresponds to a distance from the transponder to the terminal such that no signal can be sensed by the transponder. Voltage $V_{C2}$ reaches a maximum $V_{C2opt}$ for an optimum coupling coefficient $k_{opt}$ ($k/k_{opt}=1$), and then decreases to an intermediate value $V_{C2(1)}$ reached at coupling 1. The maximum coupling position is at a given location of this curve, but not necessarily at the optimum coupling position. This in particular depends on the different values of the capacitive and resistive elements.

Other remarkable points of the curve of FIG. 3 are points of inflexion where ratio $k/k_{opt}$ is respectively equal to $1/\sqrt{3}$ and to $\sqrt{3}$ and where voltage $V_{C2}$ has the same value $$\left(V_{C2opt} \cdot \frac{\sqrt{3}}{2}\right)$$

on the transponder side.

When the transponder has been brought as close to the terminal as possible by its holder, the coupling is considered to reach its value $k_{max}$ in stopped position against the terminal. This stopped position may correspond either to laying the transponder on the terminal antenna or to maintaining it at a distance from it. The maximum coupling position may according to cases be lower or higher than optimum coupling position $k_{opt}$.

Relations expressing the value of voltage $V_{C2}$ according to the ratio of the current coupling to the optimum coupling and linking the value of the equivalent resistor to the load formed by the transponder elements on its own oscillating circuit have become usual. This equivalent resistor is generally called R2. Resistor R2 represents the equivalent resistor of all the circuits (microprocessor, retromodulation means, etc.) of transponder 2, placed in parallel on capacitor C2 and inductance L2 (before or after the rectifying bridge). The conductance due to the transponder circuits, and thus their consumption, is also called "resistive load". The level of this load is symbolized by resistor R2 across the oscillating circuit.

Relations linking these relative values to the coupling and to different values taken by resistance R2 are provided, for example, in document EP-A-2276643 (B9617-09-RO-119).

It is provided to exploit these relations to force the transponder holder to place himself in contact or in quasi-contact with the reader.

For a given coupling value k, considering that the impedance of the oscillating circuit of the terminal does not vary and that the circuits remain tuned, the ratio of current coefficients k to optimum coefficients $k_{opt]R20}$ and $k_{opt]R21}$, respectively for a resistor R2 of value R20 and of value R21, may be expressed (for example, by exploiting the relations indicated in the above-mentioned document), as:

$$\frac{\frac{k}{k_{opt]R20}}}{\frac{k}{k_{opt]R21}}} = \sqrt{\frac{R20}{R21}}. \quad \text{(formula 1)}$$

Still in the same conditions, the square of the ratio, noted r, of current coefficient k to optimum coefficient $k_{opt]R20}$, according to voltages $V_{C2]R20}$ and $V_{C2]R21}$ of voltage $V_{C2}$, respectively for values R20 and R21 of resistor R2, may be written as:

$$r^2 = \left(\frac{k}{k_{opt]R20}}\right)^2 \qquad \text{(formula 2)}$$

$$= \frac{\frac{V_{C2]R21}}{V_{C2]R20}} \cdot \frac{R20}{R21} - 1}{1 - \frac{V_{C2]R21}}{V_{C2]R20}}}$$

When the coupling is optimum with resistor R21 ($k=k_{opt]R21}$), the following may also be written:

$$r^2 = \left(\frac{k}{k_{opt]R20}}\right)^2 \qquad \text{(formula 3)}$$

$$= \frac{R20}{R21}$$

For a coupling position $k_{opt]R21}$ corresponding to the optimum coupling with resistor R21, one may write:

$$V_{C2opt]R21} = \left(1 + \frac{1}{\left(\frac{k}{k_{opt]R20}}\right)^2}\right) \cdot \frac{V_{C2]R20}}{2} \qquad \text{(formula 4)}$$

Such relations enable, by varying the value of resistance R2, the transponder to determine when it is in a relation of maximum coupling with the terminal.

Figure 4:
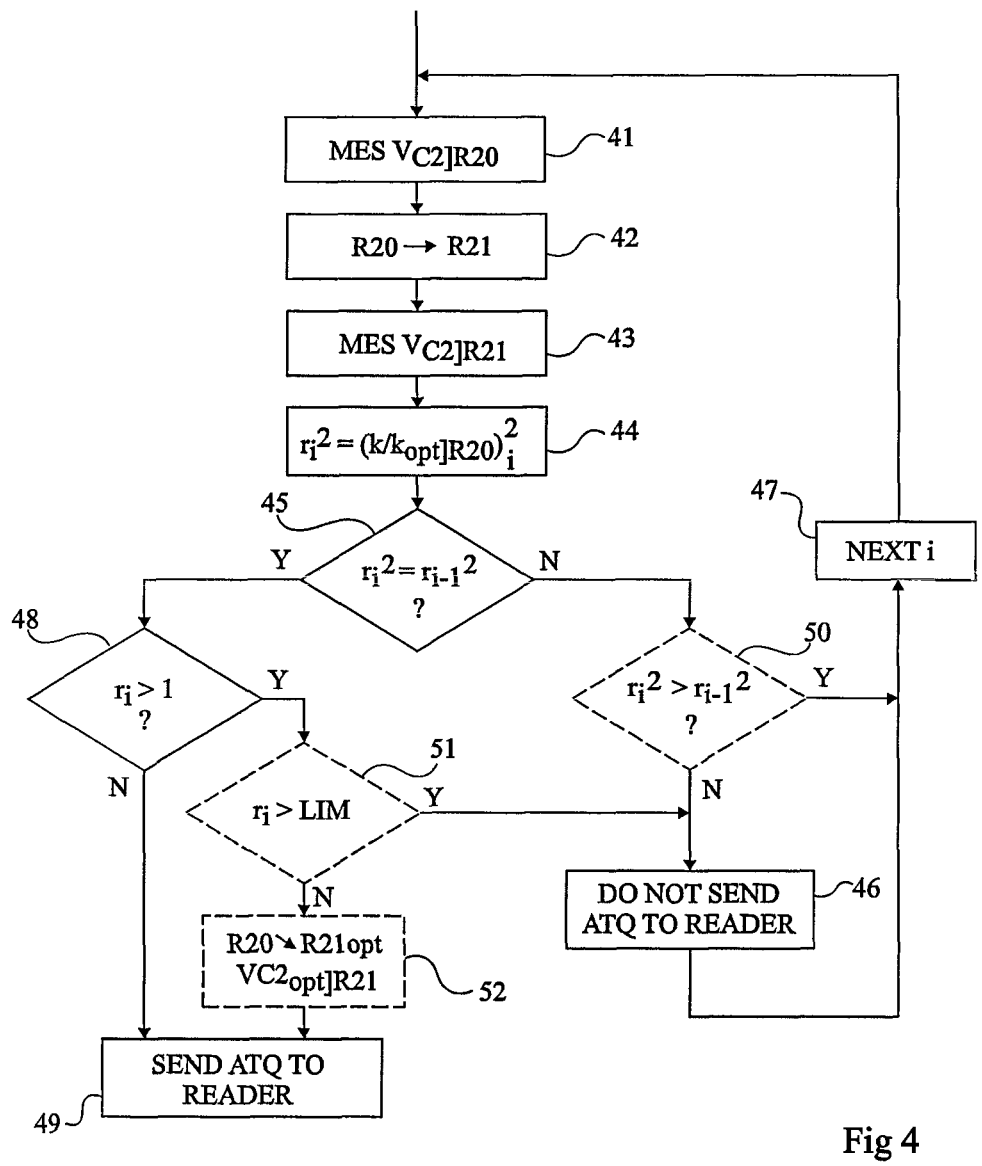
FIG. 4 is a block diagram illustrating an embodiment of the protection method.

FIG. 4 is a simplified flowchart of an implementation mode of the transaction protection method.

To simplify the discussion of FIG. 4, it is still referred to values $V_{C2]R20}$ and $V_{C2]R21}$, knowing that it is in practice easier to measure values $V_{Ca]R20}$ and $V_{Ca]R21}$ of voltage $V_{Ca}$ but that this changes nothing to the comparison thresholds of the ratio of the current coupling to the optimum coupling at a given value of the resistance.

Periodically, the transponder measures (block 41, MES $V_{C2]R20}$) and stores the voltage across capacitor C2 with a first value R20 of resistance R2.

Then (block 42, R20→R21), the value of resistive element R2 is modified to a higher value R21.

The current value of the ratio of coupling k to optimum value $k_{opt]R20}$ with resistance R20, squared (block 44, $r_i^2 = (k/k_{opt]R20})_i^2$, is then calculated and stored. This calculation is performed, for example, according to the above formula 2. As a variation, the value may be decreased to a lower value R21.

The current ratio is then compared (block 45, $r_i^2 = r_{i-1}^2$?) with ratio $r_{i-1}$ calculated at the previous iteration (i–1). This test amounts to determining whether the distance between the transponder and the terminal varies. It should be noted that the squares of the ratios can then be directly compared.

If the distance varies (output N of block 45), that is, the user moves one of the two elements with respect to the other, the transponder cannot be in contact with the terminal. The sending by the transponder of an acknowledgement for a request that it receives from the terminal is then forbidden (block 46, DO NOT SEND ATQ TO READER) and it is looped onto a next measurement (block 47, NEXT i).

If the distance no longer varies (output Y of block 45), it is then determined (block 48, $r_i > 1$?) whether the current ratio is greater than 1. This amounts to considering that the maximum coupling has been reached for a value greater than the optimal coupling.

If ratio $r_i$ is greater than 1 (output Y of block 48), this means that the terminal may be a pirate device and it is then proceeded to the input of block 46 forbidding the sending of an acknowledgement.

If it is not, (output N of block 48), the transponder is considered to be laid on the reader antenna and to be allowed to send an acknowledgement (block 49, SEND ATQ TO READER).

According to a first optional variation illustrated in dotted lines, as long as the transponder is not stopped against the terminal package (output N of block 45), it is checked (block 50, $r_i^2 > r_{i-1}^2$?) whether the current ratio (or its square) is greater than the previous ratio. If it is (output Y of block 50), this means that the transponder is approaching and it is proceeded to step 47. If it is not (output N of block 50), this means that the transponder is moving away and before proceeding to the next iteration, the sending of an acknowledgement is then forbidden (block 46).

Allowing/forbidding the sending of an acknowledgement amounts, in a simple embodiment, to modifying the state of a bit (flag) conditioning the sending of acknowledgements ATQ. As a variation, step 46 may be omitted, which means that there then is no proper forbidding procedure. The transponder simply only enters a response process (sending of an acknowledgement) if an authorized terminal, in contact and stopped against it, is detected.

According to another optional variation, the relations are exploited to have the maximum coupling coincide with the optimum coupling, if possible, and thus optimize the security of the communication. Indeed, this imposes an operating point such that, as soon as the transponder moves away from the terminal, this reflects as a decrease in the recovered voltage.

According to this variation illustrated in dotted lines in FIG. 4, once tests 45 and 48 have validated the fact that the maximum coupling position has been reached, a comparison (block 51, $r_i >$ LIM) of the current value of ratio $r_i$ with a limiting value is performed. If the limiting value has not been reached, a decrease (block 52, R20→R21$_{opt}$, $V_{C2opt]R21}$) in the value of resistance R2 is caused to obtain a voltage $V_{C2}$ equal to $V_{C2opt]R21}$. This value is preferably previously calculated by application of formula 4. Thereby, coupling $k_{max}$ in stopped position is matched with the critical optimum so that any motion of the transponder away from the terminal causes a decrease in its remote supply voltage, since this then corresponds to the monotonous portion of voltage $V_{C2}$ decreasing according to the coupling (FIG. 3).

If the variation of blocks 51 and 52 is omitted, a system in which an acknowledgement may be forbidden for no reason is obtained, which does not adversely affect the security.

According to another variation, the transponder may store ratios which are considered as unrealistic, or even corresponding to a pirate terminal. Indeed, a pirate terminal attempts to minimize the coupling that it will have with a target transponder by decreasing its own resistance or by increasing its inductance to increase the emitted field.

The transponder will not respond to the terminal, either because it reaches a supposed stopped position against the terminal, but with a ratio greater than a realistic limit (output Y of block 51), or because the stopped position has not been reached yet and that it is still getting closer or that, on the contrary, it is moving away from the terminal.

Figure 5:
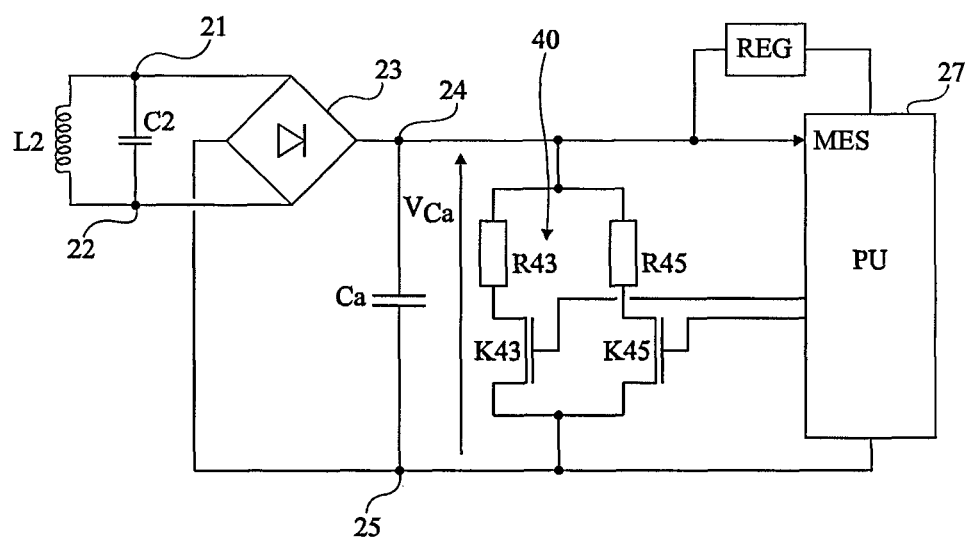
FIG. 5 is a block diagram of an embodiment of a transponder adapted to assessing its coupling factor with a terminal.

FIG. 5 is a block diagram of embodiments of a transponder 2 equipped to automatically determine, when it is in the field of a terminal (not shown), the ratio of the current coupling to the optimum coupling. The representation of FIG. 5 is simplified with respect to that of FIG. 2. In particular, the elements of demodulation, retromodulation, and for obtaining the clock frequency have not been illustrated.

FIG. 5 illustrates the presence of a switchable resistive circuit 40 between terminals 24 and 25 of rectifying bridge 3. For example, two resistors R43 and R45 are connected in parallel, each being in series with a switch K43, respectively K45. Switches K43 and K45 (for example, MOS transistors) are intended to be switched, as will be seen hereafter in relation with FIG. 5, to implement the method for assisting the positioning of the transponder. Processing unit 27 receives information relative to voltage $V_{Ca}$ on an input MES to implement this method. In the example of FIG. 5, when both resistors R43 and R45 are functionally connected, resistor R2 (load of the transponder circuits) has value R20. The disconnection of one of the resistors (for example, resistor R43) increases the value of resistance R2 towards value R21. Other connections and switchings may be provided. For example, a single switchable resistor may be used, considering that one of the two values of resistance R2 corresponds to the resistive load of the other transponder circuits.

According to a preferred embodiment, the switchable resistor corresponds to that used for a resistive retromodulation. A first measurement is performed by switching the retromodulation resistor so that it is functionally in the circuit (switch K30) in the on state in the example of FIG. 2. Voltage $V_{C2]R20}$ is then measured. Then, switch K30 is turned off and voltage $V_{C2]R21}$ is measured as described in relation with FIG. 4. The implementation of the described method then requires no structural modification of a transponder equipped with a microcontroller. It is sufficient to program this microcontroller so that it thus switches the retromodulation resistor.

As a variation, the increase or the decrease of equivalent resistance R2 is caused by a variation of the power consumption of the transponder circuits, typically of processing unit 27. For example, to decrease the value of resistance R2 (to increase the power consumption), the execution of calculations or processings by unit 27 is triggered. Equivalent resistance R2 may also be increased by decreasing the power consumption of unit 27 by interrupting certain calculations.

Various embodiments have been described, and many alterations, modifications, and improvements will occur to those skilled in the art. In particular, the selection of the limiting threshold acceptable for ratio $r_i$ and the selection of the periodicity of the measurements and iterations is within the abilities of those skilled in the art according to the application. Further, the inequality relations may correspond to strict or non-strict inequalities. Further, the practical implementation of embodiments is within the abilities of those skilled in the art based on the functional indications given hereabove, by using hardware and software tools usually present in transponders. It should be noted that the implementation of these embodiments requires no modification of the terminal and is only performed on the transponder side.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method to protect communication between an electromagnetic transponder and a terminal, comprising:
    measuring a first value of voltage provided by a rectifier across an oscillating circuit of the transponder to determine a first value of a resistive load of the oscillating circuit;
    measuring a second value of said voltage for a second resistive load value;
    wherein the transmission of an acknowledgement (ATQ) for a request received from a terminal by the transponder is only allowed when the transponder is in mechanical contact or in quasi-mechanical contact with the terminal, said determination of mechanical contact or quasi-mechanical contact based on a ratio of current values associated with said measured first and second values of voltage.

2. The method of claim 1, wherein:
    a) a current value of a ratio of the current coupling factor between the transponder and the terminal to an optimum coupling factor with a first value of the resistive load is calculated and stored;
    b) said current value is compared with a previous value of this ratio, stored in a previous iteration; and
    c) as long as the two values of the ratio are not equal, steps a) and b) are repeated.

3. The method of claim 2, wherein the values of said ratio are obtained after the measurements:
    of the first value of voltage provided by a rectifier across the oscillating circuit of the transponder for a first value of the resistive load of this oscillating circuit; and
    of the second value of said voltage for the second resistive load value.

4. The method of claim 2 wherein, in case the current and previous ratios are equal:
    d) the current ratio is compared with 1; and
    e) the sending of an acknowledgement is allowed if this unity threshold has not been reached.

5. The method of claim 4, wherein if the current ratio is greater than 1:
    the sending of the acknowledgement is preceded by a decrease in the value of the resistive load if the current ratio is smaller than a threshold.

6. The method of claim 5, wherein the value of the resistive load is decreased to obtain, across the oscillating circuit, a voltage complying with the following formula:

$$V_{C2opt]R21} = \left(1 + \frac{1}{r_i^2}\right) \cdot \frac{V_{C2]R20}}{2}$$

where $V_{C2]R20}$ designates said first value of the voltage and $r_i$ designates the current ratio.

7. The method of claim 2, wherein if the current ratio is different from the previous ratio, the possible transmission of an acknowledgement is blocked.

8. An electromagnetic transponder, comprising:
    an oscillating circuit;
    a voltage measurement circuit to measure voltage across the oscillating circuit, said voltage measurement circuit arranged to:
        measure a first value of voltage across the oscillating circuit;
        determine a first resistive load value of the oscillating circuit; and
        measure a second value of said voltage for a second resistive load value; and
    a communication prevention circuit, said communication prevention circuit arranged to prevent transmission of an acknowledgement (ATQ) to a request received from a terminal the electromagnetic transponder is not in mechanical contact or in quasi-mechanical contact with the terminal, said determination of mechanical contact or quasi-mechanical contact based on a ratio of current values associated with said measured first and second values.

9. The electromagnetic transponder of claim 8, wherein said communication prevention circuit is configured to:
   a) determine a current value of a ratio of the current coupling factor between the transponder and the terminal to an optimum coupling factor with a first value of the resistive load is calculated and stored;
   b) compare said current value with a previous value of the ratio, stored in a previous iteration; and
   c) repeat acts a) and b) as long as the two values of the ratio are not equal.

10. The electromagnetic transponder of claim 9 wherein, in case the current and previous ratios are equal, said communication prevention circuit is configured to:
   d) compare the current ratio with a unity threshold; and
   e) allow sending an acknowledgement if the unity threshold has not been reached.

11. The electromagnetic transponder of claim 10, wherein if the current ratio is greater than unity, said communication prevention circuit is configured to:
   precede sending of the acknowledgement by a decrease in the resistive load value if the current ratio is smaller than a threshold.

12. The electromagnetic transponder of claim 11, wherein the resistive load value is decreased to obtain, across the oscillating circuit, a voltage complying with:

$$V_{C2opt]R21} = \left(1 + \frac{1}{r_i^2}\right) \cdot \frac{V_{C2]R20}}{2}$$

where $V_{C2]R20}$ designates said first value of the voltage and $r_i$ designates the current ratio.

13. A mobile phone device, comprising:
   an electromagnetic transponder, said electromagnetic transponder including:
      an oscillating circuit;
      a voltage measurement circuit to measure voltage across the oscillating circuit, said voltage measurement circuit arranged to:
         measure a first value of voltage across the oscillating circuit;
         determine a first resistive load value of the oscillating circuit; and
         measure a second value of said voltage for a second resistive load value; and
   a communication prevention circuit, said communication prevention circuit arranged to prevent transmission of an acknowledgement (ATQ) to a request received from a terminal the electromagnetic transponder is not in mechanical contact or in quasi-mechanical contact with the terminal, said determination of mechanical contact or quasi-mechanical contact based on a ratio of current values associated with said measured first and second values.

14. The mobile phone device of claim 13, wherein said communication prevention circuit is configured to:
   a) determine a current value of a ratio of the current coupling factor between the transponder and the terminal to an optimum coupling factor with a first value of the resistive load is calculated and stored;
   b) compare said current value with a previous value of the ratio, stored in a previous iteration; and
   c) repeat acts a) and b) as long as the two values of the ratio are not equal.

15. The mobile phone device of claim 14 wherein, in case the current and previous ratios are equal, said communication prevention circuit is configured to:
   d) compare the current ratio with a unity threshold; and
   e) allow sending an acknowledgement if the unity threshold has not been reached.

16. The mobile phone device of claim 15, wherein if the current ratio is greater than unity, said communication prevention circuit is configured to:
   precede sending of the acknowledgement by a decrease in the resistive load value if the current ratio is smaller than a threshold.

17. The mobile phone device of claim 16, wherein the resistive load value is decreased to obtain, across the oscillating circuit, a voltage complying with:

$$V_{C2opt]R21} = \left(1 + \frac{1}{r_i^2}\right) \cdot \frac{V_{C2]R20}}{2}$$

where $V_{C2]R20}$ designates said first value of the voltage and $r_i$ designates the current ratio.

* * * * *